United States Patent
Tuerk

[15] 3,692,354
[45] Sept. 19, 1972

[54] TRUCK STAKE ARRANGEMENT

[72] Inventor: Robert P. Tuerk, 7710 Candlewood Lane, Indianapolis, Ind. 46250

[22] Filed: Oct. 22, 1970

[21] Appl. No.: 83,118

[52] U.S. Cl. .................. 296/36, 52/281, 52/282, 52/470, 105/378, 296/43, 296/104
[51] Int. Cl. ............................................. B62d 33/00
[58] Field of Search ...296/10, 28 M, 29, 36, 43, 104; 280/143; 105/337, 338, 378, 380, 423; 52/281, 282, 243, 470, 479, 481, 495

[56] References Cited

UNITED STATES PATENTS

| | | |
|---|---|---|
| 3,126,224 | 3/1964 | Carter et al. .............296/28 M |
| 766,673 | 8/1904 | Curley ......................296/43 X |
| 3,349,533 | 10/1967 | Gregoire...................52/282 X |
| 630,858 | 8/1899 | Carskadon...................296/36 |
| 1,363,059 | 12/1920 | Shanahan ..................105/307 |
| 3,097,880 | 7/1963 | Reader.........................296/36 |
| 3,141,698 | 7/1964 | Kandle ........................296/36 |
| 3,494,301 | 2/1970 | Sause.....................105/382 X |
| 3,206,806 | 9/1965 | Powell.....................52/282 X |

*Primary Examiner*—Benjamin Hersh
*Assistant Examiner*—Leslie J. Paperner
*Attorney*—Woodard, Weikart, Emhardt & Naughton

[57] ABSTRACT

An arrangement of stakes for supporting panels on a flatbed truck. Hollow stakes with tapered bottom ends seatingly fit into pocket brackets mounted to the periphery of the bed. The stakes have triangular shaped cross sections with the corners of the triangle being thickened. Side panels are mounted to the bed being supportingly received by stakes with T-shaped brackets. Corner stakes with parallel first and second walls define vertically extending grooves which receive the edges of end panels. A third wall integral and perpendicular to the second wall defines a vertically extending groove for receiving the edge of a side panel. Tarpaulin rods are secured to the hollow top ends of the stakes.

12 Claims, 6 Drawing Figures

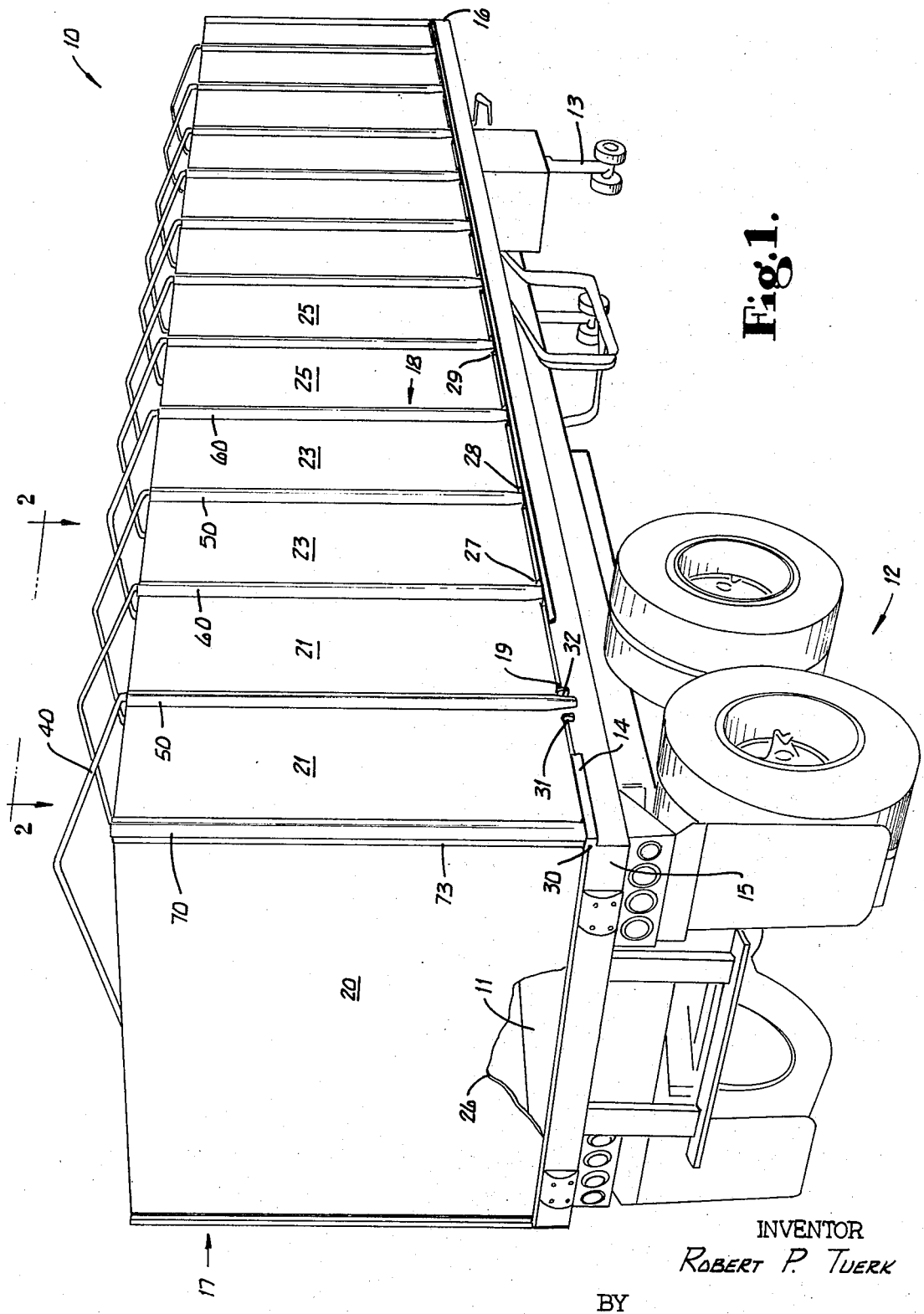

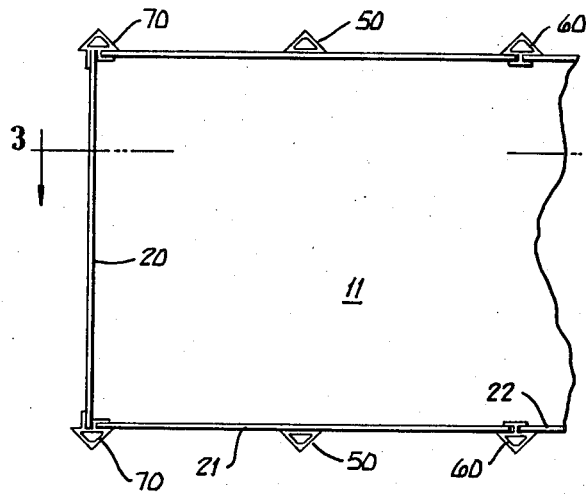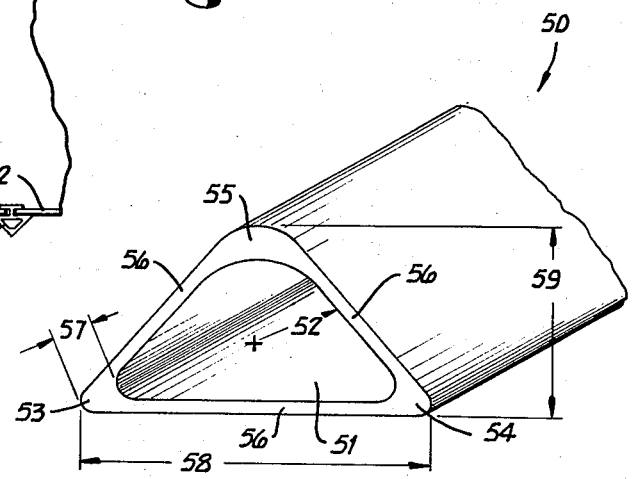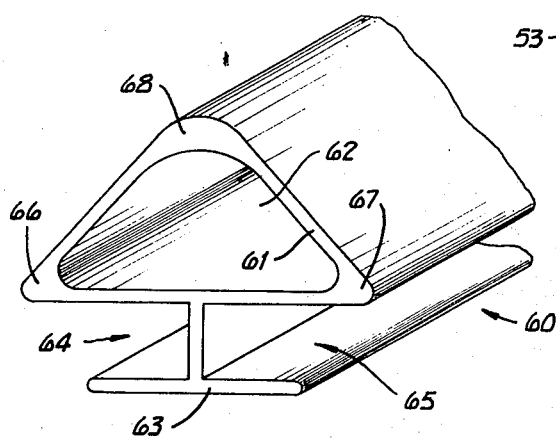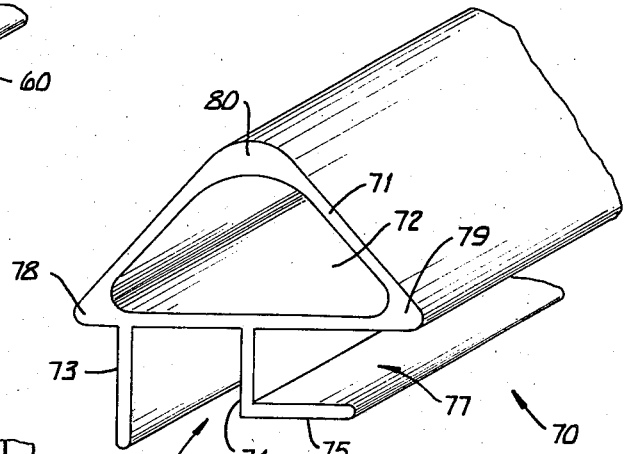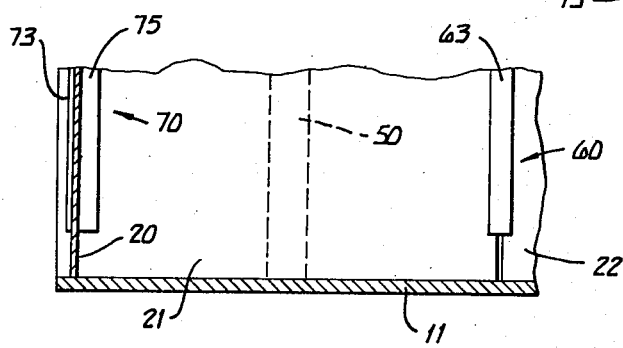

3,692,354

TRUCK STAKE ARRANGEMENT

BACKGROUND OF THE INVENTION

1. Field of the Invention. This invention relates to truck structures for highway use.

2. Description of the Prior Art. Many trailer structures have been devised for highway use in order to transport cargo. Some of these trailer structures are flatbeds with vertical side walls for containing the cargo. To improve the versatility of the trailer structure, it is desirable to convert a trailer without side walls to a trailer with side walls and vice-versa. Thus, several trailer structures have been devised having removable vertical stakes and associated panels. Four of these structures are disclosed in the following U. S. Pat. Nos.: 3,126,224 issued to Carter et al; 2,222,335 issued to Dietrich; 1,363,059 issued to Shanahan; and, 3,174,592 issued to Berman et al.

A major problem with the prior art convertible trailer structures is that a large amount of time is required to convert the structure from a plain flatbed trailer to a trailer having side and end walls. The vertically extending stakes are configured to fit and seat within a specific pocket channel secured to the periphery of the bed. These pocket brackets are of standard configuration; however, the internal dimensions of the pocket vary up to a maximum of one-half inch. Thus, the stakes are not interchangeable since they have a size configured to fit within their respective pockets. The present invention solves this problem by providing stakes having tapered triangular shaped ends which are completely interchangeable and fit within all the pocket brackets.

SUMMARY OF THE INVENTION

This invention is a stake-panel arrangement in combination with a flatbed truck. Hollow stakes having triangular shaped cross sections with thickened corners have tapered bottom ends removably seated in pocket brackets mounted around the periphery of the bed. Panels are removably mounted atop the bed and are secured thereon by the hollow stakes. Tarpaulin rods have ends seating within the hollow top ends of the stakes. The vertically extending edges of side panels seat within grooves formed by T-shaped brackets integrally mounted to some of the stakes. The vertically extending edges of end panels seat within grooves formed by a pair of parallel walls integrally attached to corner stakes. A third wall perpendicular and integral with one of the pair of walls defines a vertically extending groove receiving the edge of a side panel adjacent to an end panel. Stakes are also utilized to support the center section of the side panels.

It is an object of the present invention to provide a new, improved trailer stake arrangement having interchangeable stakes removably mounted to pocket brackets fixed to the trailer.

It is a further object of the present invention to provide a truck bed stake having a hollow top end for receiving tarpaulin rods and a tapered bottom end seatable in a pocket bracket.

It is yet another object of the present invention to provide trailer bed stakes which will seat in any standard trailer bed pocket bracket.

In addition to the above objects, it is an object of the present invention to provide trailer bed stakes which will support the center sections of panels and which will support an end panel mounted adjacent to a side panel.

Related objects and advantages of the present invention will be apparent from the following description.

BRIEF DESCRIPTION OF THE DRAWING

FIG. 1 of the drawing is a fragmentary perspective view of a flatbed trailer incorporating the present invention.

FIG. 2 is a fragmentary top view looking in the direction of arrows 2—2 of the trailer shown in Fig. 1 with bows 40 removed.

FIG. 3 is a fragmentary sectional view taken along the line 3—3 and viewed in the direction of the arrows of Fig. 2.

FIG. 4 is a fragmentary perspective view of a delta stake shown in Fig. 1.

FIG. 5 is a fragmentary perspective view of a delta T stake shown in Fig. 1.

FIG. 6 is a fragmentary perspective view of a corner delta stake shown in Fig. 1.

DESCRIPTION OF THE PREFERRED EMBODIMENT

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to Fig. 1, there is illustrated a flatbed trailer 10 having a horizontal bed 11 as shown in fragmented area 11 for positioning cargo thereon. Tires 12 are rotatably mounted to the bottom of trailer 10 and conventional extendable supports 13 are mounted to the front portion of the trailer. A bar 14 is fixedly attached to side 18 of the trailer and extends from end 15 to end 16. Bar 14 is spaced away from bed 11 with pocket brackets positioned approximately every two feet the length of the bed. Pocket brackets 19, 27, 28, 29 and 30 are identical. These brackets as well as bar 14 are quite conventional and may be found on most flatbed trailers. The brackets are C-shaped having their ends attached to the bed with their middle portion attached to bar 14. Thus, the brackets form rectangular shaped pockets for receiving the upward extending stakes 50, 60 and 70. A bar identical to bar 14 is positioned on side 17 of the trailer and is also spaced away from the edge of the bed having pocket brackets positioned therebetween and each being aligned across from the pocket brackets on the opposite side of the bed. Panels are positioned between stakes 60 and 70 to retain the cargo. The stakes are hollow and receive tarpaulin bows 40 upon which a tarpaulin is secured. Bows 40 are rods having ends inserted into the stakes along each side of the trailer.

A perspective view of a delta stake 50 is shown in Fig. 4. Stake 50 has a triangular configuration enclosing and defining opening 51 which receives the tarpaulin bow 40 previously described. Radius 52 of opening 51 is approximately 0.745 inches. In the event that the ends of bows 40 fit too loosely in the stakes, hollow cylinders, not shown may be press fitted or secured by other means in the top hollow ends of stakes 50, 60 and 70 to receive the ends of the tarpaulin bows 40. Stake 50 may be made by extruding aluminum so that the wall thickness is approximately ⅛ inch. Corners 53, 54 and 55 are substantially thicker than walls 56. The thickest portion of each corner is at least 0.300 inch as denoted by dimension 57. The bottom wall, as viewed in Fig. 4, of stake 50 is the widest of the three walls being approximately 3.250 inches in width as denoted by dimension 58. The height of the stake, denoted by dimension 59, is approximately 1.750 inches. As previously discussed the dimension of the pockets enclosed by brackets 19, 27, 28, 29 and 30 (Fig. 1) vary greatly. For example, a pocket formed by a bracket may have a length of 3 to 3 ½ inches and a width of 1 ½ to 1 ⅞ inches. The thick corners 53, 54 and 55 of stake 50 allow trimming or tapering of the corners so that the stake will readily fit into a pocket bracket. Corners 53, 54 and 55 may be filed down with a standard file or may be cut down with a saw or other means. It has been found that it is best to file or remove a portion of the corners in such a way that the body of the stake tapers toward its end. Thus, the stake may be inserted into any pocket bracket and will still be securely held therein. In fact, stakes incorporating the present invention from different trailers may be readily interchanged. Bracket 19 is fragmented at 31 to illustrate the tapered bottom end 32 of stake 50.

Delta T stake 60 is shown in Fig. 5 having a delta shaped body 61 identical to delta stake 50. A T-shaped bracket 63 is integrally attached to body 61 defining side panel receiving channels 64 and 65. The corners 66, 67 and 68 are thickened and are identical to the corners of delta stake 50. An opening 62 is formed within body 61 for receiving tarpaulin bows 40. The bottom end of stakes 60 are tapered in a manner similar to stakes 50.

Fig. 6 is a perspective view of corner delta stake 70 which has a delta shaped body 71 identical to body 61 of stake 60 (Fig. 5). Body 71 has thickened corners 78, 79 and 80 identical to the corners of stakes 50 and 60. Opening 72 is formed within body 71 for receiving tarpaulin bows 40. Walls 73 and 74 are integrally attached to body 71. Wall 74 is spaced from and parallel with wall 73 forming channel 76 for receiving back panel 20. A third wall 75 is integrally joined at right angles to wall 74 forming side channel 77 for receiving side panel 21. Fig. 3 is a fragmentary view of panels 20, 21 and 22 viewed in the direction of arrows 3—3 of Fig. 2. Back panel 20 and side panel 21 rest atop bed 11 and are secured together by corner delta stake 70. Walls 73, 74 and 75 (Fig. 6) extend from the top of stake 70 to a position immediately above bed 11. Panels 21 and 22 are parallel resting atop bed 11 and are held in place by channels 64 and 65 (Fig. 5) of delta T stake 60. T bracket 63 extends from the top of stake 60 to a position immediately above bed 11. Stake 50 is positioned on the exterior side of panel 21 and provides support therefore. Panels 23 and 25 (Fig. 1) are secured atop bed 11 and are held in place by delta T stake 60. Delta stake 50 received in pocket 28 supports panel 23. The described arrangement of panels and stakes are used completely around the periphery of the trailer bed. That is, adjacent panels are secured together by delta T stakes 60 with a delta stake 50 being used between stakes 60 to support a center section of a panel. Of course, corner delta stakes 70 are used on each one of the four corners of the trailer to support the end panels with the side panels. This arrangement is very satisfactory to contain grain or other products which rest against the side of the panels. Typically, the distance between pockets is approximately two feet thus allowing maximum panel support. In many cases, products such as steel girders are contained within trailer 10 and do not apply a large amount of force against the interior sides of the panels. In the latter case, stakes 50 may be removed since the center section of each panel does not require a support. The panels are typically made from ⅝ inch plywood and are four feet in length. The height of the panels may vary; however, standard panel heights are 4, 5, 6 and 7 feet. The end panels have identical heights to the side panels having lengths approximately the width of the trailer bed.

It will be obvious from the above description that the present invention provides a new and improved trailer stake arrangement having interchangeable stakes removably mounted to pocket brackets fixed to the trailer. It will be further obvious that these stakes have hollow top ends for receiving tarpaulin rods and tapered bottom ends seatable in pocket brackets. The tapered bottom ends of the stakes are fittable in any standard trailer bed pocket bracket. It will be additionally obvious from the above description that the present invention provides stakes for supporting the center section of the panels as well as stakes for supporting an end panel to a side panel. The present panel-stake arrangement may also be utilized on pick-up trucks and other similar vehicles as well as the semi-truck trailer illustrated in the drawing.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. In combination with a truck flat-bed having pocket brackets, each with a rectangular internal pocket, mounted around the periphery of the bed,
    hollow stakes and,
    panels removably mounted atop said bed having vertically extending ends being supported by said stakes wherein the improvement comprises:
    each hollow stake having a cross section configured as a first triangle with the corners of said triangle being thickened, said stakes having tapered bottom ends removably seated in said brackets, said tapered bottom ends having a portion of said corners removed.

2. The combination of claim 1 wherein the improvement further comprises:
    said stakes have hollow triangular shaped interiors; and, said first triangle is an isosceles triangle having three thickened corners, all of said three thickened corners are tapered at each of said bottom ends.

3. The combination of claim 2 wherein:

some of said stakes have T-shaped brackets integrally mounted thereto, said T-shaped brackets form a pair of laterally open grooves each receiving one of said vertically extending ends of said panels.

4. The combination of claim 3 wherein:

some of said stakes have first, second and third walls projecting therefrom and being integral therewith, said first and second walls are parallel and spaced apart forming a laterally open groove receiving one of said vertically extending ends of said panels, said third wall is perpendicular and integral with said second wall forming another laterally open groove receiving one of said vertically extending ends of said panels.

5. The combination of claim 4 wherein:

said T-shaped brackets and said first, second and third walls extend only from above said bed to the top ends of said stakes.

6. The combination of claim 5 wherein:

said bed is rectangular with a pair of ends and a pair of sides;

two of said panels are end panels mounted over said ends of said bed, the remainder of said panels are side panels mounted over said sides of said bed, said end panels are of equal size and said side panels are of equal size;

said stakes with said T-shaped brackets are positioned between said side panels;

said stakes with said first, second and third walls are positioned between said end panels and said side panels.

7. The combination of claim 6 and further comprising:

tarpaulin bowed rods having ends positioned in said hollow stakes.

8. The combination of claim 6 wherein:

pocket brackets are positioned between said stakes with T-shaped brackets and receive stakes extending upward against said side panels.

9. A stake for use in a truck flatbed comprising:

a length of rigid elongated material of generally constant cross section;

said cross section being externally triangular and internally triangular so as to define a triangular configuration having three side walls and corners joining said three side walls;

said corners being thicker than said walls;

one of said side walls being longer than the other two side walls which are of equal length.

10. The stake of claim 9 wherein said cross section additionally comprises a T-shaped configuration with the base of the T-shaped configuration secured to and extending perpendicular of the one side wall of the triangular configuration.

11. The stake of claim 9 wherein said cross section additionally comprises an L-shaped configuration and a |-shaped configuration with one leg of the L-shaped configuration being secured to and extending perpendicularly of the one side wall of the triangular configuration, said |-shaped configuration being secured to and extending perpendicularly of the one side wall of the triangular configuration, said L-shaped configuration having its other leg extending from the distal end of said one leg in a direction away from said |-shaped configuration.

12. In combination with a truck flatbed having pocket brackets, each with a rectangular internal pocket, mounted around the periphery of the bed, hollow stakes and, panels removably mounted atop said bed having vertically extending ends being supported by said stakes wherein the improvement comprises:

each of said stakes having a cross section configured as an isosceles triangle with the center hollow of said stakes also being configured as a triangle with the corners of said isosceles triangle being thickened, said stakes having bottom ends removably seated in said brackets.

* * * * *